United States Patent
Fleming

(10) Patent No.: US 10,367,820 B1
(45) Date of Patent: Jul. 30, 2019

(54) METHODS, SYSTEMS, AND COMPUTER READABLE MEDIUMS FOR IDENTIFYING COMPONENTS OF A COMPUTING SYSTEM

(71) Applicant: VCE Company, LLC, Richardson, TX (US)

(72) Inventor: Jeffery A. Fleming, Apex, NC (US)

(73) Assignee: VCE IP Holding Company LLC, Richardson, TX (US)

( * ) Notice: Subject to any disclaimer, the term of this patent is extended or adjusted under 35 U.S.C. 154(b) by 355 days.

(21) Appl. No.: 14/467,556

(22) Filed: Aug. 25, 2014

(51) Int. Cl.
*H04L 29/06* (2006.01)
*H04L 29/08* (2006.01)

(52) U.S. Cl.
CPC ........ *H04L 63/104* (2013.01); *H04L 67/2833* (2013.01)

(58) Field of Classification Search
CPC ........................ H04L 67/1061; H04L 67/1068; H04L 63/104
See application file for complete search history.

(56) References Cited

U.S. PATENT DOCUMENTS

| | | | | |
|---|---|---|---|---|
| 2007/0073832 | A1* | 3/2007 | Curtis | H04L 69/24 709/217 |
| 2009/0276774 | A1* | 11/2009 | Kinoshita | G06F 21/6218 718/1 |
| 2011/0004680 | A1* | 1/2011 | Ryman | H04L 67/14 709/224 |

* cited by examiner

*Primary Examiner* — Nam T Tran
(74) *Attorney, Agent, or Firm* — Jenkins, Wilson, Taylor & Hunt P.A.

(57) ABSTRACT

Methods, systems, and computer readable mediums for identifying components of a computing system are disclosed. According to one exemplary embodiment, a method for identifying a component of a computing system occurs at a component. The method includes receiving, while the component is in a low power state, a request for identification information about the component from a requesting entity and in response to receiving the request for the identification information, sending the identification information about the component to the requesting entity.

20 Claims, 4 Drawing Sheets

1

METHODS, SYSTEMS, AND COMPUTER READABLE MEDIUMS FOR IDENTIFYING COMPONENTS OF A COMPUTING SYSTEM

TECHNICAL FIELD

The subject matter described herein relates to identification techniques. More specifically, the subject matter relates to methods, systems, and computer readable mediums for identifying components of a computing system.

BACKGROUND

Computing networks, systems, and/or components therein may be audited or inspected by one or more parties for various reasons. For example, a hardware manufacturer may audit a computing platform for quality assurance (QA) purposes, a software vendor may audit a computing network for software licensing purposes, or a business may perform an internal audit of computing infrastructure for asset management and/or budgetary concerns. When auditing such computing infrastructure, a significant amount of time, money, and/or other resources can be spent performing manual inspections, e.g., opening cabinets and scanning barcodes or reading labels.

SUMMARY

Methods, systems, and computer readable mediums for identifying components of a computing system are disclosed. According to one exemplary embodiment, a method for identifying a component of a computing system occurs at a component. The method includes receiving, while the component is in a low power state, a request for identification information from a requesting entity and in response to receiving the request for the identification information, sending the identification information to the requesting entity.

BRIEF DESCRIPTION OF THE DRAWINGS

The subject matter described herein will now be explained with reference to the accompanying drawings of which.

DETAILED DESCRIPTION

Figure 1:
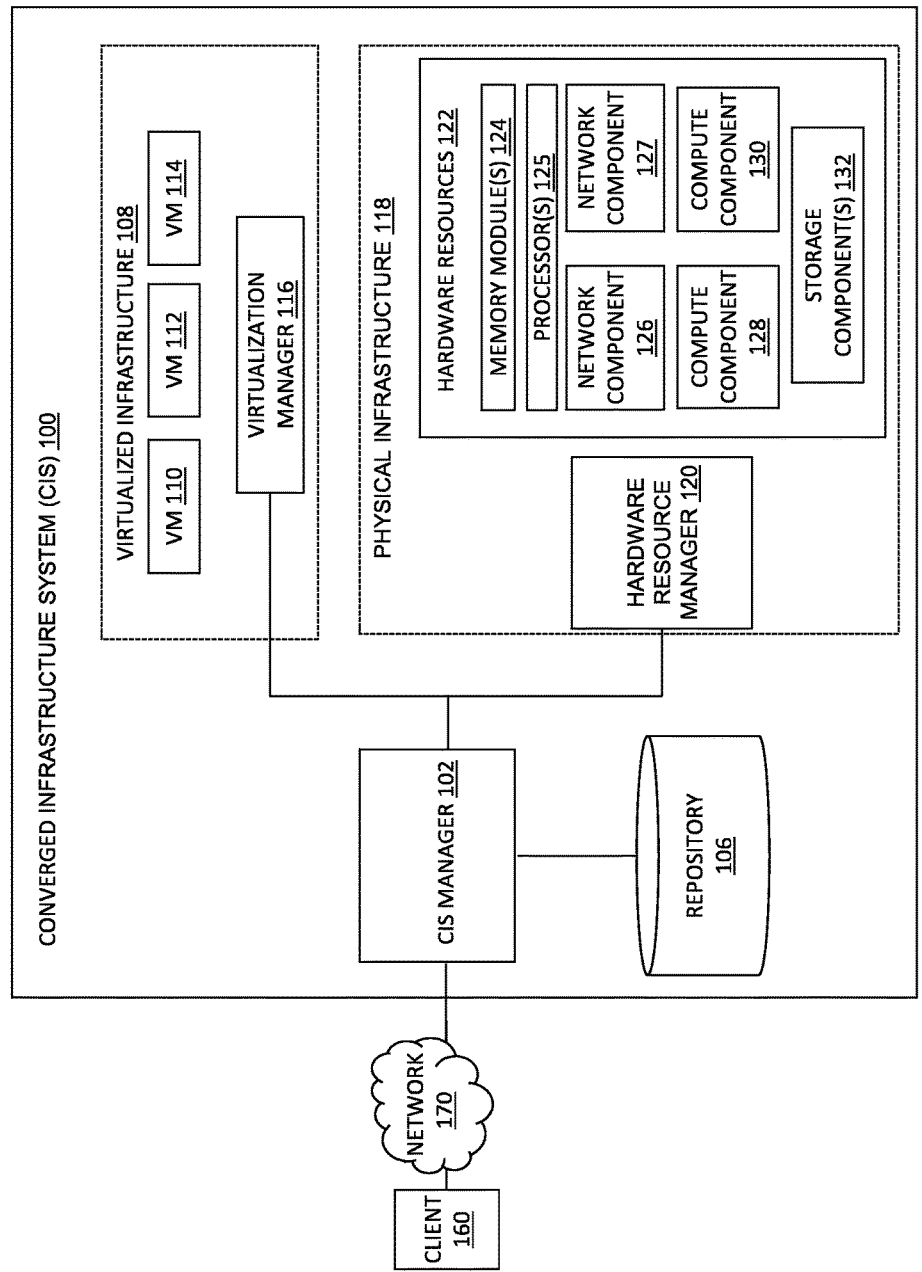
FIG. 1 is a diagram illustrating an exemplary converged infrastructure system according to an embodiment of the subject matter described herein.

The subject matter described herein includes methods, systems, and computer readable mediums for identifying components of a computing system. In accordance with some aspects of the disclosed subject matter, identifying components of a computing system can include methods and/or techniques for auditing (e.g., validating) a computing system or components therein. For example, a computing system to be audited can include one or more computing platforms comprising one or more computing system components (CSCs), such as compute components, software components, network components, switching components, storage components, hardware components, firmware components, and/or other elements. In some embodiments, an exemplary computing system for providing and/or performing identification related functions can comprise any computing system and/or device that utilizes one or more processors and memory, such as an integrated infrastructure (which may include a plurality of compute components, each of which includes one or more processors and memory). One exemplary integrated infrastructure includes a converged infrastructure system (CIS), such as, for example, a Vblock™ System from VCE Company, LLC. A CIS can comprise multiple CSCs (e.g., components, physical resources and/or virtual resources) in a preconfigured or prepackaged computing platform, where some CSCs are developed and/or manufactured by multiple entities. For example, an exemplary CIS can comprise data storage devices, servers, networking equipment, and software for managing physical resources and/or virtualized resources (e.g., virtual servers). Although the following disclosure describes the use of one or more CISs, any integrated infrastructure system or device may be utilized without departing from the scope of the present subject matter.

In accordance with some aspects of the disclosed subject matter, identification information associated with a CSC can be requested and/or provided, e.g., using a network message, an Ethernet frame, and/or an Ethernet packet. Exemplary identification information can include any information usable for auditing or identifying a system or portions therein. For example, identification information can include a system metric, a serial number, an identifier (ID), a globally unique ID (GUID), a version number, a release number, a purchase order ID, a current user, and/or a location.

In accordance with some aspects of the disclosed subject matter, one or more CSCs associated with a computing system can include functionality for receiving and responding to messages while in various power management states. For example, an Ethernet enabled CSC can include an identification module, e.g., software, hardware, custom firmware, and/or a firmware extension. In this example, the identification module may be configured to receive, identify, authenticate, and/or respond to an identification information request. In this example, a response message can include a payload containing identification information. In another example, a CSC can include a virtual resource, such as a virtual machine (VM). In this example, the VM or a related entity (e.g., a processor executing the VM) may boot with a custom basic input/output system (BIOS) extension that responds to an identification information request with a payload with identification information.

In accordance with some aspects of the disclosed subject matter, identification on local area network (IDOL) functionality can be implemented by one or more CSCs. Exemplary IDOL functionality may include using various protocols and/or messages (e.g., a wake on local area network (WOL) message, a wake on wireless local area network (WoWLAN) message, and/or other network messages) to request and provide identification information about one or more CSCs across one or more networks, including the Internet. Exemplary IDOL functionality may also allow a CSC in various power management states, such as a low power state (e.g., powered-down, sleeping, or turned off) or in a full power state, to "listen" for identification information requests (e.g., IDOL messages) and respond to appropriate requests with payloads containing identification information. For example, an IDOL capable CSC may receive an identification information request in a specially designed packet, such as an interrogation magic packet. The interrogation magic packet may be addressed to a particular CSC (e.g., an Ethernet device in a computer) using various information, e.g., a media access control (MAC) address associated with the CSC, an identifying number built into the CSC, or other information about the CSC that enables it to be uniquely recognized and addressed on a network. In this example, the IDOL capable CSC may determine when a relevant interrogation magic packet is received and may respond with a specific identifying payload.

In accordance with some aspects of the disclosed subject matter, a source entity may generate identification information and/or can include functionality (e.g., at a CSC) for providing identification information. For example, a manufacturer of a network switch may generate a firmware extension and a unique identifier (e.g., a CSC ID) for the network switch. In this example, the firmware extension may cause the network switch to respond to an identification information request by sending the unique ID to a requesting entity.

In accordance with some aspects of the disclosed subject matter, various advantages can be readily appreciated over previous methods for identifying components associated with a computing system. For example, exemplary advantages can include automating an auditing or licensing process and/or performing auditing using identification information generated by a source entity and provided by the component. By utilizing techniques described herein (e.g., an "over the wire" or networked method for identifying CSCs (e.g., physical and virtual resources), auditing can be performed continuously and on demand. Moreover, by utilizing techniques described herein, replaced or relocated CSCs can be easily identified and license violations can be readily discovered. In contrast, previous methods for identifying components associated with a computing system, including hand scanners, enterprise resource planning software, and complex network probes, can be resource intensive, inefficient, and error-prone. Moreover, previous methods for auditing virtualized resources generally require a separate discovery process, which may be executed by multiple administrators across different operating systems and require additional coordination.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary CIS 100 according to an embodiment of the subject matter described herein. Although the following disclosure describes the use of CIS 100, any type of computer system may be utilized without departing from the scope of the present subject matter. CIS 100 can comprise CSCs, such as virtual resources and physical resources. Exemplary physical resources can comprise a processor, a memory module, a compute component, a network component, a storage component, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CISs), a virtual machine, a virtual server, a virtual storage device, a virtual port, and/or a virtual communications interface. CIS 100 may also comprise software and related components for managing the CIS and/or portions (e.g., CSCs) therein.

In some embodiments, CIS 100 may be configured to provide data center functionality, cloud service functionality, and/or other functionality. CIS 100 may be capable of communicating with other CISs (e.g., located at various physical locations or sites) and may communicate with various other entities, such as network nodes (e.g., servers hosting online sites) and users. For example, client 160 may represent any entity (e.g., software executing on a processor, a web-based interface, etc.) for allowing a user (e.g., a human operator or an automated system) to interact with CIS 100, CSCs therein, and/or other entities. In some embodiments, client 160 may establish communication directly with CIS 100 without using network 170.

In some embodiments, CIS 100 can comprise a CIS manager 102 (e.g., a CIS management module), a repository 106, virtualized infrastructure 108, and/or physical infrastructure 118. CIS manager 102 may be any suitable entity for managing aspects of CIS 100 or portions therein (e.g., CSCs or groups of CSCs). CIS manager 102 may be configured to communicate with various CSCs and/or for managing various CSCs. For example, CIS manager 102 can be configured to access each CSC within CIS 100 and return relevant information to client 160. For example, CIS manager 102 may be configured to manage performance, resource utilization levels, and other aspects associated with virtualized infrastructure 108 and/or physical infrastructure 118. In some embodiments, CIS manager 102 can comprise VCE Vision™ Intelligent Operations software and/or firmware.

In some embodiments, CIS manager 102 can interact with CSCs (e.g., virtual and physical resources) in CIS 100. In some embodiments, CIS manager 102 may be configured to receive, relay, route or forward identification information requests (e.g., Ethernet frames or packets) to one or more CSCs or other entities (e.g., client 160). In this example, CIS manager 102 and/or other CSCs associated with CIS 100 can include one or more communications interfaces, such as an Institute of Electrical and Electronics Engineers (IEEE) 802.3 Ethernet interface, an IEEE 802.11 wireless interface, and/or other interfaces.

In some embodiments, network messages may be usable for requesting identification information and/or providing identification information. For example, an IDOL message (e.g., a specially formatted Ethernet frame) may be sent to CIS 100 from client 160. In this example, the IDOL message may be for requesting that one or more CSCs associated with CIS 100 provide identification information. Continuing with this example, CIS manager 102 may utilize a communications bus and/or other mechanisms for providing the IDOL message or copies thereof to the one or more CSCs.

In some embodiments, CIS manager 102 and/or other entities can include functionality for routing and/or broadcasting identification information requests, e.g., network messages. For example, CIS manager 102 may be configured to act as an IDOL gateway service and may send or broadcast a network message directed to one location or entity (e.g., CIS 100) to multiple locations or entities (e.g., CSCs associated with CIS 100). In another example, CIS manager 102 and/or other entities may be configured to use (e.g., receive and/or send) subnet directed broadcasts. In this example, a subnet directed broadcast may be treated as a "normal" network message until processed by a final router, such as CIS manager 102, which can convert the network message into a true broadcast packet. By using subnet directed broadcast functionality, a requesting entity may initiate a broadcast message (e.g., an IDOL message for requesting identification information from all CSCs associated with CIS 100) on a remote network, but may require intervening routers between the requesting entity and the destination to forward the subnet directed broadcasts.

In some embodiments, prior to routing or broadcasting identification information requests, CIS manager 102 and/or other entities may be configured to filter, ignore, or discard unauthorized (e.g., unauthenticated) identification information requests. For example, before broadcasting a network message, CIS manager 102 may determine whether the network message is authorized, e.g., sent by an authorized entity or originating from an authorized location, entity, or address. In this example, if the network message is authorized, the network message may be broadcasted to other entities and/or destinations, but if the network message is not authorized, the network message may be discarded and/or a system operator may be notified.

Virtualized infrastructure 108 can comprise a virtualization environment configured to simulate components of a computing device, e.g., a processor, system memory, and a storage device, for executing one or more virtual machines (VMs) (e.g., VM 110, VM 112, and VM 114). Each of VM 110, VM 112, and VM 114 may be configured to perform various functions and/or services, such as web server functions or cloud application services, and may interact with various nodes, components, and/or users.

In some embodiments, virtualized infrastructure 108 can be associated with one or more virtual entities. Each virtual entity can comprise one or more CIS or portions therein, e.g., CSCs from one or more CISs. In some embodiments, virtualization manager 116 may allow logical entities to be created, deleted, or modified using an API and/or a graphical user interface (GUI). Virtualization manager 116 may be any suitable entity (e.g., software executing in a virtual machine) for managing aspects associated with virtualized infrastructure 108. In some embodiments, virtualization manager 116 may be configured to provide data center management through one or more communications interfaces. For example, virtualization manager 116 may communicate with one or more third-party management tools using APIs.

Physical infrastructure 118 can comprise hardware resources 122, such as memory module(s) 124, processor(s) 125, network components 126-127, compute components 128-130, and one or more storage component(s) 132. Hardware resources 122 may be communicatively connected to various other CSCs in CIS 100 and other entities. Hardware resources 122 can be configured for use by one or more virtual entities. In some embodiments, network components 126-127 (e.g., network switches) may be configured to enable communication between the components in CIS 100. In some embodiments, one or more file share storage (FSS) systems (not shown) can be utilized to provide file system level access to a CIS across a local area network (LAN).

Hardware resource manager 120 can be any suitable entity (e.g., software executing in a virtual machine) for managing aspects associated with physical infrastructure 118. In some embodiments, hardware resource manager 120 may be configured to provision hardware resources 122 via one or more communications interfaces. For example, hardware resource manager 120 may provision hardware resources 122 for implementing one or more virtual entities in virtualized infrastructure 108. In some embodiments, hardware resource manager 120 may comprise any management component or entity, such as a unified infrastructure manager (UIM) or a unified computing system (UCS) director entity, which is configured to provision the physical hardware of CIS 100.

In some embodiments, CSCs can include functionality (e.g., hardware, firmware, or software executing using hardware and/or firmware) for receiving identification information requests and for responding to the identification information requests. For example, VM 110 or a related identification module associated with VM 110 may receive an identification information request, e.g., an IDOL message or network message. In this example, VM 110 and/or the related identification module may be configured to receive the IDOL message, authenticate the IDOL message, and, if the IDOL is authenticated, provide identification information to a requesting entity. In another example, compute component 128 can include an identification module (e.g., a firmware or basic input/output system (BIOS) extension that inspects Ethernet frames for a sequence indicating an identification information request). In this example, the identification module may be configured to receive an identification information request, authenticate the request, and, if compute component 128 is in a low power state, change the power state of compute component 128 such that a response including identification information can be sent to a requesting entity.

In some embodiments, processor(s) 125 can include a microprocessor (e.g., a trusted platform module (TPM) using trusted execution technology (TXT)), central processing unit (CPU), or any other like hardware based processing unit. In some embodiments, some aspects of the disclosed subject matter can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of aspects of the disclosed subject matter. In some embodiments, storage component(s) 132 can include any storage medium or storage unit that is configured to store data accessible by processor(s) 125 via a system bus. In some embodiments, repository 106 or portions thereof may utilize storage component(s) 132 and/or memory module(s) 124. In some embodiments, repository 106 and/or storage component(s) 132 can include or utilize one or more storage area networks.

As indicated above, the subject matter disclosed herein can be implemented in software in combination with hardware and/or firmware. For example, subject matter described herein can be implemented in software executed by a processor. In another example, subject matter described herein may be implemented as a firmware extension and/or a BIOS extension. In some exemplary implementations, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, an identification module or repository 106 (e.g., a system library or data therein) may be located at a single computing system or may be distributed across one or more devices, platforms, and/or systems. As used in the disclosed subject matter, the terms "function" or "module" refer to hardware, firmware, or software in combination with hardware and/or firmware for implementing features described herein.

In some embodiments, various entities depicted in FIG. 1 may be incorporated or implemented using one or more other entities depicted in FIG. 1. For example, memory module(s) 124 and/or processor(s) 125 may be incorporated in compute component 128, compute component 130, and/ or a specialized device or compute component (e.g., an application management pod (AMP)). In another example, CIS manager 102 may be implemented using or located in an AMP and/or another device in physical infrastructure 118. In yet another example, virtualization software and/or virtualized components may be implemented using an AMP and/or another compute device (e.g., a blade appliance designated for some system management software).

It will be appreciated that FIG. 1 is for illustrative purposes and that various components, their locations, and/ or their functions as described above in relation to FIG. 1 may be changed, altered, added, or removed. Further, aspects of the disclosed subject matter (e.g., an identification module) may be implemented and/or located on any computing system or components therein.

Figure 2:
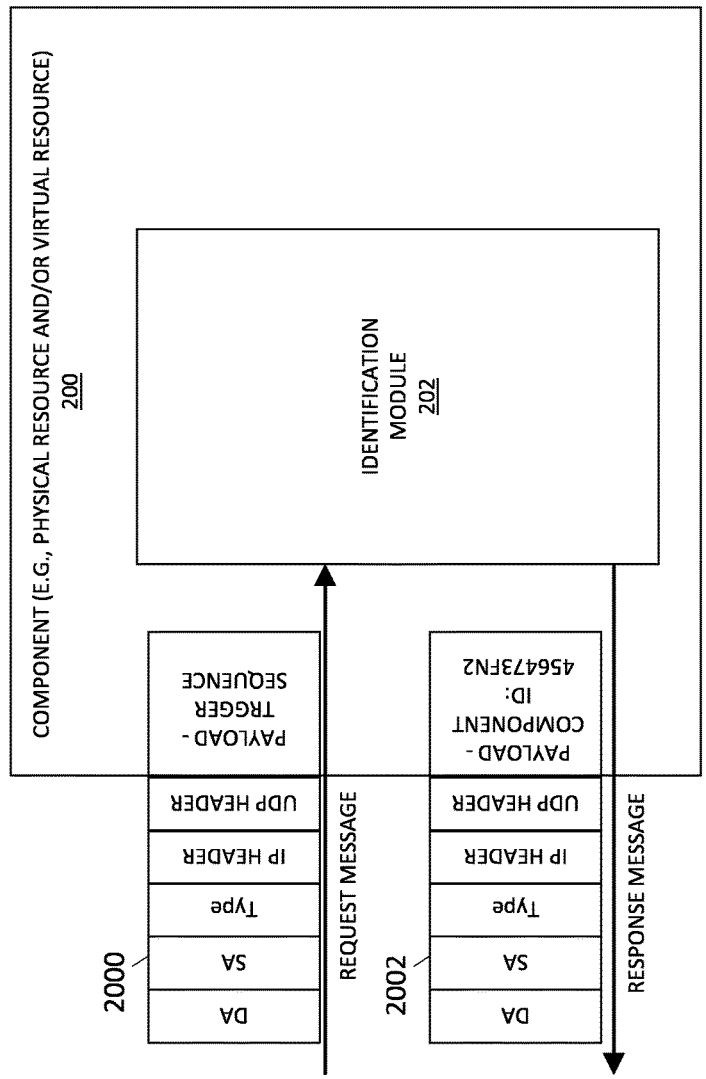
FIG. 2 is a diagram illustrating an exemplary component for providing identification information according to an embodiment of the subject matter described herein.

FIG. 2 is a diagram illustrating an exemplary component 200 for providing identification information according to an embodiment of the subject matter described herein. Referring to FIG. 2, component 200 may represent any CSC or group of CSCs, e.g., one or more virtual resources and/or one or more physical resources. For example, component 202 may represent VM 110 and/or a processor executing VM 110. In another example, component 202 may represent an Ethernet enabled device, such as network component 127, compute component 128, or storage component(s) 132.

Component 200 can include an identification module 202. Identification module 202 may be any suitable entity for receiving identification information requests, authenticating identification information requests, and/or responding to identification information requests with identification information. For example, identification module 202 can include a custom Ethernet driver, a firmware extension, a bios extension, an application-specific integrated circuit (ASIC), a field-programmable gate array (FPGA), and/or software executing on a processor for receiving identification information requests, authenticating identification information requests, and/or responding to identification information requests with identification information.

In some embodiments, identification module 202 can include firmware generated or modified by a source entity. For example, an original equipment manufacturer (OEM) may extend hardware with firmware providing one or more functions associated with receiving and responding to identification information requests. The OEM may use an inventory assessment tool during the manufacturing process to set and incorporate a CSC ID in each unit produced. After final assembly, a scan may be run against the final unit and information (e.g., product numbers and/or other data) may be determined. This information may then be recorded in a database and indexed by the CSC ID incorporated in each unit.

In some embodiments, identification module 202 may be configured to operate at one or more open systems interconnection (OSI) model layers, e.g., at a physical layer and/or a data link layer. In some embodiments, identification module 202 may be configured to operate below an operating system level, e.g., at a firmware level associated with a communication interface. In some embodiments, identification module 202 may be configured to operate as operating system agnostic and/or platform agnostic.

In some embodiments, identification module 202 can include functionality for receiving, listening for, and/or detecting identification information requests. In some embodiments, identification information requests (e.g., IDOL request messages) may be independent of power state. For example, identification module 202 may be configured to listen for specially formatted messages (e.g., identification information requests) and which may trigger identification module 202 to perform one or more actions. In this example, triggerable actions can include authenticating a received message, discarding a received message, ignoring a received messages, logging information about a received message, triggering a power state change (e.g., awakening a sleeping CSC), responding to the received message, and/or providing identification information.

Request message 2000 may represent an exemplary identification information request that can be processed by identification module 202. In some embodiments, request message 2000 can include an Ethernet broadcast frame containing header information and a payload. Exemplary header information can include a destination address (DA), a source address (SA), a payload type, an IP header, and/or a UDP header. Exemplary payload information can include a trigger sequence, e.g., one or more bytes of data and/or other information usable by identification module 202 for detecting request message 2000. For example, request message 2000 may contain anywhere within its payload a trigger sequence comprising seven bytes of '255' (e.g., FF FF FF FF FF FF FF in hexadecimal), followed by sixteen repetitions of a destination 48-bit MAC address, totaling 110 bytes. In this example, the trigger sequence may be usable to awaken component 200 from a low power state in addition to requesting identification information. In some embodiments, a trigger sequence may be stored in header information and/or elsewhere in request message 2000.

In some embodiments, identification module 202 may utilize IDOL functionality or related functionality such that a CSC (e.g., component 200) in sleep mode can be surveyed. For example, in response to receiving request message 2000, IDOL functionality or related functionality associated with identification module 202 may be configured to trigger component 200 to change to a higher power state and/or provide a response message.

In some embodiments, identification module 202 may be configured to utilize WOL functionality and/or WoWLAN functionality for providing IDOL functionality. For example, identification module 202 may configure or modify portions of WOL related firmware or software at a NIC such that the NIC "listens" for IDOL messages and responds to appropriate IDOL messages with identification information. In another example, identification module 202 may configure or modify portions of WoWLAN related firmware or software at a NIC such that the NIC "listens" for IDOL messages and responds to appropriate IDOL messages with identification information.

In some embodiments, identification module 202 may be configured to generate a response message for virtual resources in various power management states. In some embodiments, response messages (e.g., IDOL response messages) may be independent of power state. For example, identification module 202 may be configured to generate a response message for virtual resources without requiring a virtual resource to be in a running state. In this example, assuming IDOL power management functions are available, identification module 202 associated with VM 118 may receive request message 2000 and/or generate response message 2002 while in a low power state. In another example, identification module 202 associated with VM 118 may receive request message 2000 and/or generate response message 2002 while VM 118 is in a running state or a normal power state.

Response message 2002 may represent an exemplary identification information response that can be generated or sent by identification module 202. In some embodiments, response message 2002 can include an Ethernet frame containing header information and a payload. Exemplary header information can include a destination address (DA), a source address (SA), a payload type, an IP header, and/or a UDP header. Exemplary payload information can include a CSC ID, a serial number, a purchase order ID, a version number, a release ID, system metrics, a location, and/or other useful information. For example, response message 2002 can include a CSC ID that can be used to query a database for additional identification information.

In some embodiments, identification module 202 may be configured to utilize security related functions, such as encryption and decryption. For example, when request message 2000 is received, identification module 202 may decrypt request message 2000 for authentication purposes and may encrypt identification information in response message 2002, e.g., using TLS-based security.

In some embodiments, a requesting entity may use identification information from component 200 for various purposes. Some exemplary purposes can include licensing, quality assurance, and/or auditing related purposes. For example, certain software features of CIS 100 may be restricted or limited to certain hardware or to a certain configuration based on a licensing agreement between a manufacturer and a customer. Using identification information from CIS 100, a manufacturer may determine whether aspects of the licensing agreement are being upheld or violated, e.g., by determining whether the software features are executing on unauthorized hardware. In another example, an auditor (e.g., an internal or external entity) may use identification information from a computing system to determine the number and type of CSCs in the computing system.

It will be appreciated that FIG. 2 is for illustrative purposes and that additional and/or different functionality may be used to request or provide identification information other than the functionality depicted in FIG. 2. For example, request message 2000 and response message 2002 may be subject to changes depending on various factors, including hardware, firmware, and/or software implementations, use cases, and/or network limitations. In this example, request message 2000 may include a different trigger sequence (e.g., a sequence of 6 bytes of "218" and 4 repetitions of a destination MAC address) and/or other format differences than those described above with regard to FIG. 2.

Figure 3:
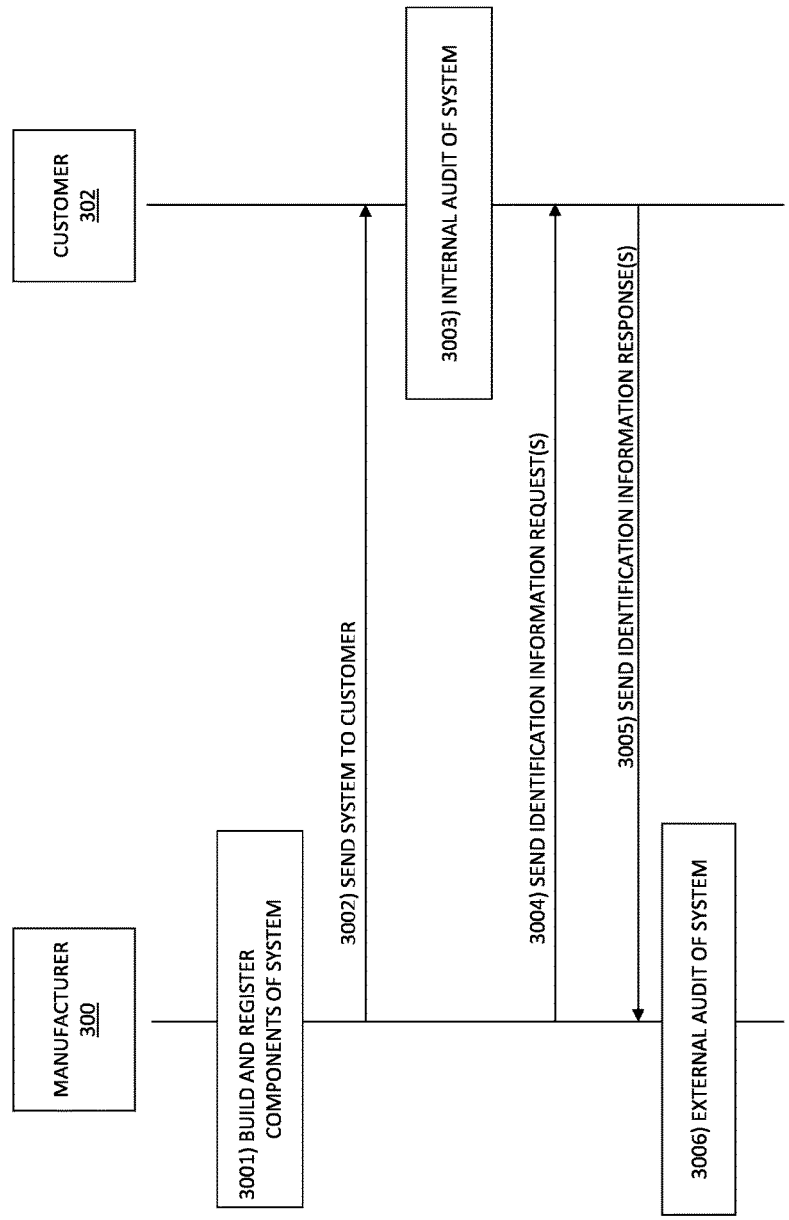
FIG. 3 is a diagram illustrating an exemplary identification procedure according to an embodiment of the subject matter described herein.

FIG. 3 is a diagram illustrating an exemplary identification procedure according to an embodiment of the subject matter described herein. In some embodiments, a source entity (e.g., a manufacturer 300) may generate identification information for a computing system and/or CSCs therein, e.g., during a configuration phase and/or prior to shipment to a customer 302. In such embodiments, the identification information may be stored or incorporated into the computing system and/or CSCs therein, such that the identification information can be requested and provided to a requesting entity.

Referring to FIG. 3, at step 3001, manufacturer 300 may build, configure, and/or assemble a computing system. For example, manufacturer 300 may use various CSCs in building and configuring CIS 100. In this example, manufacturer 300 may assess CIS 100 to generate identification information, such as a CSC ID, state information, a serial number, a model number, and/or an owner ID. Continuing with this example, manufacturer 300 may store the identification information in a memory (e.g., a firmware extension) associated with CIS 100, where the identification information may be encrypted or otherwise secured from unauthorized access.

At step 3002, manufacturer 300 may send the computing system to customer 302. For example, manufacturer 300 may hire a carrier to transport CIS 100 to customer 302. In another example, manufacturer 300 may deliver and set up CIS 100 for customer 302.

At step 3003, customer 302 may audit the computing system and/or its CSCs using identification information associated with the computing system. For example, after receiving CIS 100, customer 302 may generate an identification information request and may send the request to CIS 100 or CSCs therein via a network message, such as an Ethernet packet or frame. CIS 100 may broadcast the identification information request to every CSC associated with CIS 100. After receiving an identification information request, each CSC may receive the request and send identification information.

In some embodiments, identification module 202 and/or another entity (e.g., at CIS manager 102) may combine and/or utilize identification information from multiple CSCs. For example, identification module 202 and/or another entity may collate, integrate, and/or combine identification information from multiple CSCs into a single response message containing the combined identification information. In this example, the response message may be sent to an auditor or other entity. In another example, identification module 202 and/or another entity may use identification information from multiple CSCs to generate relevant reports, such as inventory profiles, licensing profiles, and/or other reports.

At step 3004, manufacturer 300 or another requesting entity (e.g., a third party licensing auditor) may send one or more identification information request(s) to the computing system. For example, manufacturer 300 may utilize software and/or a stand-alone device to send one or more network messages (e.g., IDOL messages) to a computing system controlled by customer 302. In this example, identification module 202 at the computing system may receive the one or more network messages and may determine whether the network messages are authorized.

In some embodiments, determining whether an identification information request is authorized can include inspecting header information for a password or other security related information. For example, an IDOL message can include a SecureOn password (e.g., a hexadecimal password of 6 bytes) that may be verified by identification module 202 and/or another entity. In another example, a network message may be sent via a connection secured using secure sockets layer (SSL) or transport layer security (TLS). In this example, identification module 202 and/or another entity may decrypt and/or authenticate the network message using a session key associated with the connection.

In some embodiments, an identification information request may be usable to trigger a receiving entity (e.g., VM 110 or another CSC) to change from a low power state to a higher power state. For example, an IDOL message may be received by a communications interface (e.g., a network interface card) associated with a CSC and may trigger the CSC to move from a sleep mode to an awake or normal power mode.

At step 3005, customer 302 may send one or more identification information response(s) to manufacturer 300 or another requesting entity (e.g., a third party licensing auditor). For example, after determining that a network message is authorized, identification module 202 at the computing system may generate a response message that includes identification information, such as a CIS ID and/or one or more CSC IDs.

At step 3006, manufacturer 300 or another requesting entity (e.g., a third party licensing auditor) may audit the computing system and/or its CSCs using identification information associated with the computing system. For example, after receiving an identification information response containing a CSC ID, manufacturer 300 may use the CSC ID to query a database containing CSC related information, such as a purchase order ID, a current owner, a licensing status, and/or other information. In this example, manufacturer 300 may use the CSC ID and/or other obtained CSC related information to generate an audit, a report, or other information, e.g., indicating whether CIS 100 includes appropriate (e.g., expected or purchased) CSCs and/or appropriate (e.g., expected or licensed) configurations.

It will be appreciated that FIG. 3 is for illustrative purposes and that additional and/or different steps than those depicted in FIG. 3 may be used to audit a computing system and/or CSCs therein. Additionally, it will be appreciated that steps depicted in FIG. 3 may occur in a different order than depicted. For example, steps 3004 may occur prior to or concurrently with step 3003.

Figure 4:
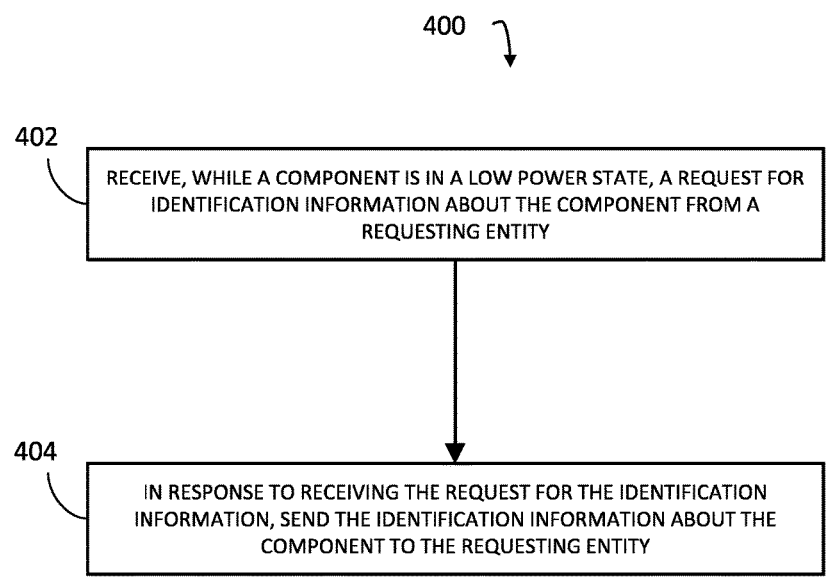
FIG. 4 is a diagram illustrating an exemplary method for identifying a component of a computing system according to an embodiment of the subject matter described herein.

FIG. 4 is a diagram illustrating an exemplary method 500 for identifying a component of a computing system according to an embodiment of the subject matter described herein. In some embodiments, exemplary method 300 and/or steps therein may be performed by CIS 100, CIS manager 102, identification module 202, a CSC (e.g., component 200), and/or another node or module. For illustrative purposes and explanation, references to entities included in FIGS. 1-3 may be used below.

At step 402, a request for identification information about component 200 is received while component 200 is in a low power state (e.g., a sleep mode). The request may be received from a requesting entity, such as manufacturer 300. In this example, compute component 128 can include identification module 202 that utilizes IDOL technology to wake up and process identification information requests, e.g., requests from a licensing compliance officer, an auditor, or a related entity or device.

In some embodiments, a request for identification information can include at least one member selected from a group consisting of a network message, an Ethernet message, an Ethernet packet, an Ethernet frame, an Internet protocol (IP) packet, a transmission control protocol (TCP) packet, a user datagram protocol (UDP) packet, a magic packet, an identification on local area network (IDOL) message, a WoWLAN message, and/or a WOL message.

In some embodiments, identification information can include at least one member selected from a group consisting of a component ID, a system metric, a serial number, a GUID, a version number, a release number, a purchase order ID, a current user, and/or a location.

In some embodiments, a requesting entity can include at least one member selected from a group consisting of a manufacturer of the component, a seller of the component, an auditor, and/or an owner of the component.

In some embodiments, a request for identification information may trigger component 200 to change from a low power state to a higher power state.

In some embodiments, determining whether a request is authorized may be performed prior to sending identification information to a requesting entity. For example, header information, such as a source address, or other information in a received request for identification may be analyzed to determine whether the request is from an appropriate entity or location.

In some embodiments, determining whether a request is authorized can include determining that the request originates from at least one member selected from a group consisting of an authorized entity, an authorized location, and/or an authorized device.

At step 404, in response to receiving the request for the identification information, the identification information about component 200 may be sent to the requesting entity. For example, component 200 may receive and authenticate a request for identification information and, in response, may send a CSC ID (e.g., a unique component ID assigned by manufacturer 300) or other identifying information to a requesting entity (e.g., a quality assurance inspector).

In some embodiments, component 200 can include at least one member selected from a group consisting of a converged infrastructure system (CIS), a computing platform, a computing device, a virtual machine, a hypervisor, a compute component, a network component, a storage component, software, an operating system, firmware, hardware, a physical resource, and/or a virtual resource.

It should be noted that identification module 202 and/or functionality described herein may constitute a special purpose identification or auditing system. Further, identification module 202 and/or functionality described herein can improve the technological field of identifying one or more CSCs (e.g., component 200) and can improve auditing, reporting, quality assurance, and licensing compliance.

The subject matter described herein for identifying a component of a computing system improves the functionality of auditing tools and auditing in general by providing for more efficient information gathering. It should also be noted that a computing platform that implements the subject matter described herein may comprise a special purpose computing device usable to receive and/or respond to identification information requests during various power management states.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for identifying a component of a computing system, the method comprising:

starting a component with a custom basic input/output system (BIOS) extension that responds to an identification information request with identification information, wherein the component includes a virtual machine (VM) or a virtual resource associated with the virtual machine;

receiving, while the component is in a low power state, a request for identification information about the component from a requesting entity; and after receiving the request for the identification information, the custom BIOS extension triggers a change in power state of the component prior to sending, by the component, the identification information about the component to the requesting entity, wherein the identification information includes a VM identifier or a virtual resource identifier.

2. The method of claim 1 wherein the request includes at least one member selected from a group consisting of a network message, an Ethernet message, an Ethernet packet, an Ethernet frame, an Internet protocol (IP) packet, a transmission control protocol (TCP) packet, a user datagram protocol (UDP) packet, a magic packet, an identification on local area network (IDOL) message, a wake on wireless local area network (WoWLAN) message, and a wake on local area network (WOL) message.

3. The method of claim 1 wherein the request triggers the component to change from the low power state to a higher power state.

4. The method of claim 1 comprising determining whether the request is authorized prior to sending the identification information.

5. The method of claim 4 wherein determining whether the request is authorized includes determining whether the request originates from at least one member selected from a group consisting of an authorized entity, an authorized location, and an authorized device.

6. The method of claim 1 wherein the identification information about the component further includes at least one member selected from a group consisting of a system metric, a serial number, a component identifier (ID), a globally unique ID (GUID), a version number, a release number, a purchase order ID, a current user, and a location.

7. The method of claim 1 wherein the component further includes a converged infrastructure system (CIS), a computing platform, a computing device, a hypervisor, a compute component, a network component, a storage component, software, an operating system, firmware, hardware, or a physical resource.

8. A system for identifying a component of a computing system, the system comprising:
the component that is in a low power state, wherein the component is started with a custom basic input/output system (BIOS) extension that responds to an identification information request with identification information, wherein the component includes a virtual machine (VM) or a virtual resource associated with the virtual machine, wherein after receiving the request for the identification information, the custom BIOS extension triggers a change in power state of the component prior to the identification information being sent, the component comprising:
memory; and
an identification module implementing using the memory and a processor, wherein the identification module is configured to receive, while the component is in a low power state, a request for identification information about the component from a requesting entity and after receiving the request for the identification information, to send the identification information about the component to the requesting entity, wherein the identification information includes a VM identifier or a virtual resource identifier.

9. The system of claim 8 wherein the request includes at least one member selected from a group consisting of a network message, an Ethernet message, an Ethernet packet, an Ethernet frame, an Internet protocol (IP) packet, a transmission control protocol (TCP) packet, a user datagram protocol (UDP) packet, a magic packet, an identification on local area network (IDOL) message, a wake on wireless local area network (WoWLAN) message, and a wake on local area network (WOL) message.

10. The system of claim 8 wherein the component is configured to change from the low power state to a higher power state in response to receiving the request.

11. The system of claim 8 wherein the component is configured to determine whether the request is authorized prior to sending the identification information.

12. The system of claim 11 wherein the component is configured to determine whether the request is authorized by determining whether the request originates from at least one member selected from a group consisting of an authorized entity, an authorized location, and an authorized device.

13. The system of claim 8 wherein the identification information about the component further includes at least one member selected from a group consisting of a system metric, a serial number, a component identifier (ID), a globally unique ID (GUID), a version number, a release number, a purchase order ID, a current user, and a location.

14. The system of claim 8 wherein the component further includes a converged infrastructure system (CIS), a computing platform, a computing device, a hypervisor, a compute component, a network component, a storage component, software, an operating system, firmware, hardware, or a physical resource.

15. A non-transitory computer readable medium having stored thereon executable instructions which, when executed by a processor of a computer, cause the computer to perform steps comprising:
starting a component with a custom basic input/output system (BIOS) extension that responds to an identification information request with identification information, wherein the component includes a virtual machine (VM) or a virtual resource associated with the virtual machine;
receiving, while the component is in a low power state, a request for identification information about the component from a requesting entity; and
after receiving the request for the identification information, the custom BIOS extension triggers a change in power state of the component prior to sending, by the component, the identification information about the component to the requesting entity, wherein the identification information includes a VM identifier or a virtual resource identifier.

16. The non-transitory computer readable medium of claim 15 wherein the request includes at least one member selected from a group consisting of a network message, an Ethernet message, an Ethernet packet, an Ethernet frame, an Internet protocol (IP) packet, a transmission control protocol (TCP) packet, a user datagram protocol (UDP) packet, a magic packet, an identification on local area network (IDOL) message, a wake on wireless local area network (WoWLAN) message, and a wake on local area network (WOL) message and wherein the request triggers the component to change from the low power state to a higher power state.

17. The non-transitory computer readable medium of claim 15 comprising determining whether the request is authorized prior to sending the identification information.

18. The non-transitory computer readable medium of claim 17 wherein determining whether the request is authorized includes determining whether the request originates from at least one member selected from a group consisting of an authorized entity, an authorized location, and an authorized device.

19. The non-transitory computer readable medium of claim 15 wherein the identification information about the component further includes at least one member selected from a group consisting of a system metric, a serial number, a component identifier (ID), a globally unique ID (GUID), a version number, a release number, a purchase order ID, a current user, and a location.

20. The non-transitory computer readable medium of claim 15 wherein the component further includes a converged infrastructure system (CIS), a computing platform, a computing device, a hypervisor, a compute component, a network component, a storage component, software, an operating system, firmware, hardware, or a physical resource.

\* \* \* \* \*